(12) United States Patent
Shafter

(10) Patent No.: US 8,478,814 B2
(45) Date of Patent: Jul. 2, 2013

(54) METHOD AND SYSTEM FOR REMOTELY DIRECTING A FISHING TOURNAMENT

(75) Inventor: Richard M. Shafter, Montreal (CA)

(73) Assignee: 4390890 Canada Inc., Montreal (CA)

( * ) Notice: Subject to any disclaimer, the term of this patent is extended or adjusted under 35 U.S.C. 154(b) by 20 days.

(21) Appl. No.: 13/244,238

(22) Filed: Sep. 23, 2011

(65) Prior Publication Data

US 2012/0021837 A1 Jan. 26, 2012

Related U.S. Application Data

(63) Continuation of application No. 11/744,737, filed on May 4, 2007, now abandoned.

(60) Provisional application No. 60/873,018, filed on Dec. 6, 2006.

(51) Int. Cl.
*G06F 17/00* (2006.01)

(52) U.S. Cl.
USPC .............................................. 709/203; 705/1

(58) Field of Classification Search
USPC .............................. 700/91; 463/31–43; 705/1
See application file for complete search history.

(56) References Cited

U.S. PATENT DOCUMENTS

| 4,839,675 | A | 6/1989 | Owen |
|---|---|---|---|
| 5,560,615 | A | 10/1996 | Van Der Mude |
| 6,222,449 | B1 | 4/2001 | Twining |
| 6,587,740 | B2 | 7/2003 | Byrne |
| 6,959,499 | B2 | 11/2005 | Bini |
| 7,266,233 | B2 | 9/2007 | Chang et al. |
| 7,268,894 | B2 | 9/2007 | Matsumiya et al. |
| 7,269,281 | B2 | 9/2007 | Anei |
| 7,561,729 | B2 | 7/2009 | Willis |
| 2002/0059205 | A1 | 5/2002 | Graham et al. |
| 2003/0115265 | A1 | 6/2003 | Kitade |
| 2004/0029627 | A1 | 2/2004 | Hannan et al. |
| 2004/0249860 | A1 | 12/2004 | Stechschulte et al. |
| 2005/0240420 | A1 | 10/2005 | Iverson et al. |
| 2005/0248762 | A1 | 11/2005 | Lehtikoski et al. |
| 2007/0052997 | A1 | 3/2007 | Hull et al. |

*Primary Examiner* — Masud Ahmed
(74) *Attorney, Agent, or Firm* — Myers Wolin, LLC

(57) ABSTRACT

A method for remotely directing a fishing tournament makes use of a data network over which participants transmit submissions indicating sizes of fish caught. The submissions may include digital images of fish, and size may be determined from a scale established using a reference object depicted in the image. The data network may also be used to register participants and provide them with tournament results. Participants may register for a fishing period, or multiple fishing periods of the tournament, and may be issued a code to be displayed in images of fish. Validation of entries may include an examination of metadata in submitted digital images.

17 Claims, 9 Drawing Sheets

METHOD AND SYSTEM FOR REMOTELY DIRECTING A FISHING TOURNAMENT

CROSS-REFERENCE TO RELATED APPLICATIONS

This application is a continuation of U.S. application Ser. No. 11/744,737, filed May 4, 2007, which claims the benefit from U.S. Provisional Patent Application No. 60/873,018, filed Dec. 6, 2006, the contents of each of which are incorporated herein by reference.

FIELD OF THE INVENTION

The present invention relates to a method and system for remotely directing a fishing tournament using a data network such as the Internet. More specifically, the present invention relates to a method and system for registering contest participants, receiving entries from participants, determining fish sizes from digital images submitted by participants and reporting the contest winners.

BACKGROUND OF THE INVENTION

Fishing contests, typically referred to as "tournaments," allow anglers to compete against one other in trying to catch the longest or heaviest fish, or collection of fish, over a given period of time. Traditionally, such tournaments are held in a fixed location, and the fish are killed in order to allow them to be measured or weighed at the end of the contest. Recently, however, there has been significant interest in "catch and release" fishing, in which an angler returns a fish to the water alive after catching it. To conduct a tournament in which the fish are not killed, however, requires evidence of the size of the fish, such as a photograph. In addition, it would be desirable to hold a tournament in which participants may be remote from one another, and/or where the organization and direction of the tournament is remote from the participants.

U.S. Patent Application No. US 2003/0115265 ("Kitade") discloses a system and method for holding a location-independent fishing competition in which a sponsor of the competition communicates with participants via the Internet to organize and direct the contest. The participants register for a tournament held during a specific time period by transmission of data over the Internet. After the fishing period is over, they then submit digital images of fish before a predetermined deadline to be compared with those of other participants. To ensure that the image was taken during the fishing period, an "article of certification" must also be shown in the image. The article of certification is an object of a specific type that is designated by the sponsor, and the identity of which is provided to the participants at the outset of the fishing period.

SUMMARY OF THE INVENTION

In accordance with some embodiments of the present invention, a method and system are provided which allow the remote direction of a fishing tournament. A data network, which typically includes the Internet, is used for at least part of the communication between a tournament director and tournament participants. In conducting the tournament, the tournament director remotely records each fishing catch via information transmitted over the data network. In a particular embodiment, digital images of fish are received over the data network from participants. The images contain a reference object adjacent to the fish to allow a determination of scale. By using the scale provided by the reference object, a size of the fish may be determined, and the established size may be stored together with related data regarding the catch.

The size measurement of the fish may be in one dimension, such as the length of the fish. In such a case, the reference object may be a linear measurement device. Two-dimensional measurements, or the use of other measurement criteria, are also possible. In one embodiment, a human facial biometric, such as the limbus of the human eye, is used as a reference object. Other means of determining the size of the fish, without the use of a reference object, are also possible.

The data network may also be used to collect data to register tournament participants and to provide to participants, at the end of the tournament, an indication of one or more winning submissions. The participants may also be provided with a code, by transmission over the data network or via other communication means, that is to be displayed as part of submitted digital images. The code is issued a fixed amount of time prior to the commencement of a particular fishing period, and its use ensures that the images were taken during the fishing period in question. In one variation, each participant is issued a different code unique to that participant.

In an illustrative embodiment of the invention, participants are registered for the tournament by receiving data transmitted over a data network. The tournament may have multiple fishing periods within the tournament duration and, if so, each participant may register for one or more of the fishing periods. During the tournament, participation submissions are received over the data network. The submissions include indications of size of fish caught by participants, such as through the use of digital images of fish and reference objects, as discussed above. The submissions are validated as relating to fish caught during the corresponding fishing period or periods for which the corresponding participants were registered, and as being accurate indications of fish size. Different means of validation may be used, including examining the metadata in an image file submitted by a participant. The absence of metadata, or an indication in the metadata of a prohibited type of editing of the image may be used as a basis for rejecting a submission. At the end of the tournament period, at least one winning participant is determined based on the sizes of fish caught by participants as indicated in the validated submissions. An indication of one or more winning submissions is then provided to the participants over the data network.

BRIEF DESCRIPTION OF THE FIGURES

Embodiments of the invention will be described by way of example only with reference to the accompanying drawings, in which.

DETAILED DESCRIPTION

An integral part of remotely directing a fishing tournament is providing a means to determine the size of fish submitted by participants. It is possible to rely on self-reporting on the part of participants, or to provide some form of verification by a third party. However, it is also possible to use digital images of fish submitted by participants to establish and/or verify fish sizes.

Figure 1:
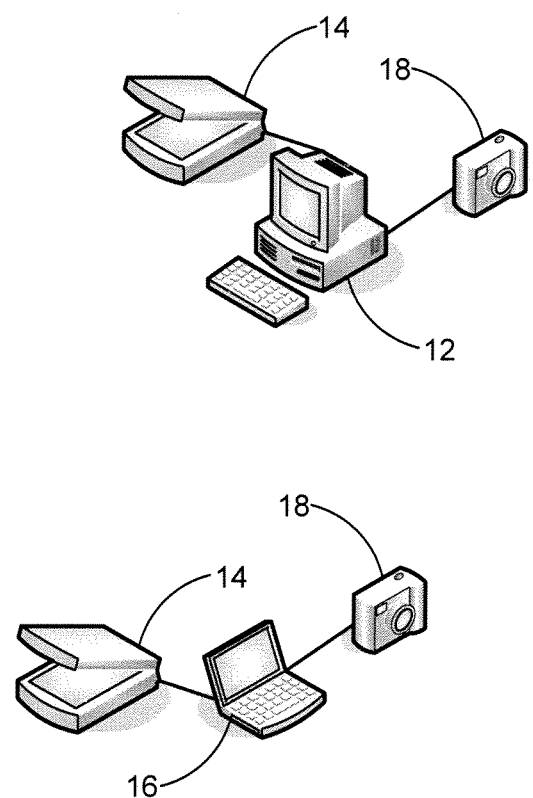
FIG. 1 is a schematic view of computing devices implementing a system for measuring a fish.

Referring to FIG. 1, users may directly access a system for measuring a fish implemented on, for example, a personal computer 12 or a laptop computer 16, equipped with, for example, a digital scanner 14 or a digital camera 18 with which to obtain a digital image of a fish to be measured.

Figure 2:
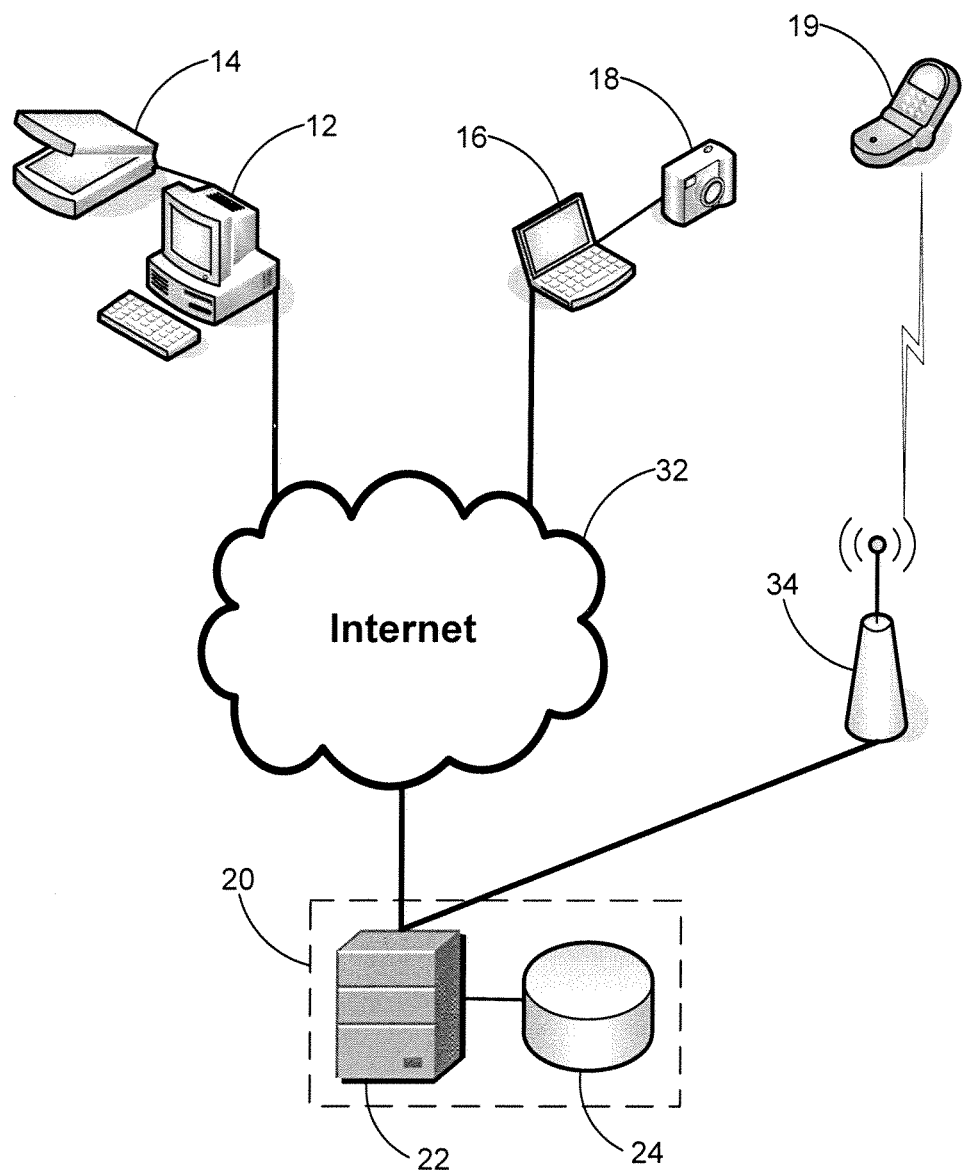
FIG. 2 is a schematic view of a network where computing devices are connected to a system for measuring a fish through a network.

Alternatively, with reference to FIG. 2, users using remote access software, such as, for example, a web browser installed on the personal computer 12, the laptop computer 16 or a cell phone 19, may remotely access a system 20 for measuring a fish implemented on a central system through, for example, a web site on a server 22. The server 22 may also be connected to a database 24 for storing submitted digital images of fish along with measurement results. Furthermore, in the context of a fishing tournament, the server 22 may also implement tournament software. The personal computer 12 and laptop computer 16 may connect to the server 22 using an Internet connection 32 such as, for example, Ethernet (broadband, high-speed), wireless WiFi, cable Internet, satellite connection, etc., and the cell phone 19 using a cellular or satellite network 34.

The users may use various devices such as, for example, the digital scanner 14, the digital camera 18 or the cell phone 19 comprising a digital camera to provide digital images of fishes to the system for measuring a fish.

Figure 3:
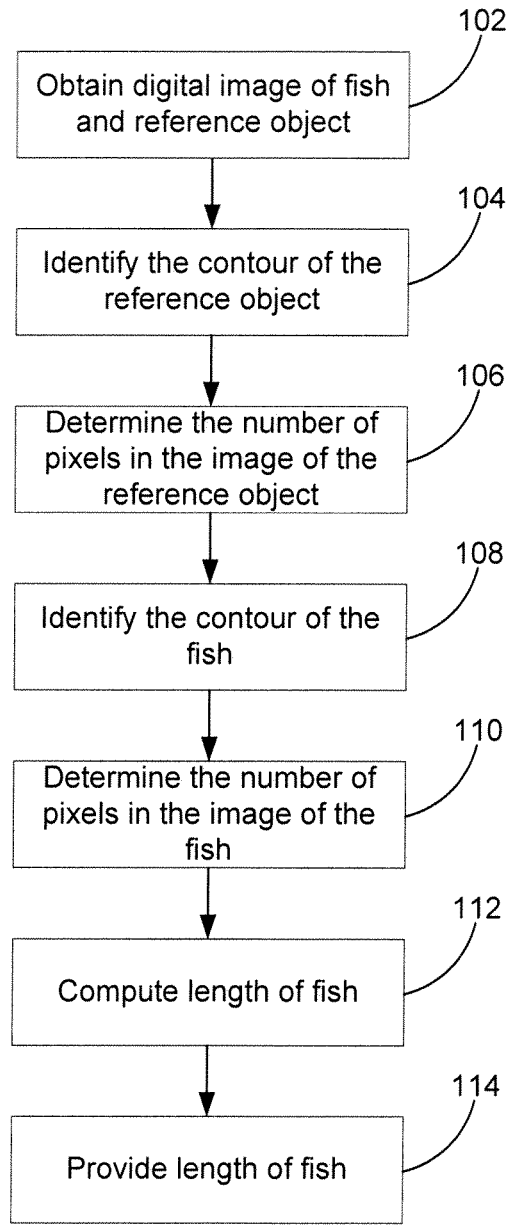
FIG. 3 is a flow diagram depicting a method of measuring a fish according to a non-limitative embodiment of the present invention.

Referring now to FIG. 3, there is shown a flow diagram depicting the method of measuring a fish according to a non-limitative embodiment of the present invention. The method may be executed either by the personal computer 12, the laptop computer 16 or the server 22 (shown in FIG. 2). The steps of the process are indicated by blocks 102 to 114.

Figure 4:
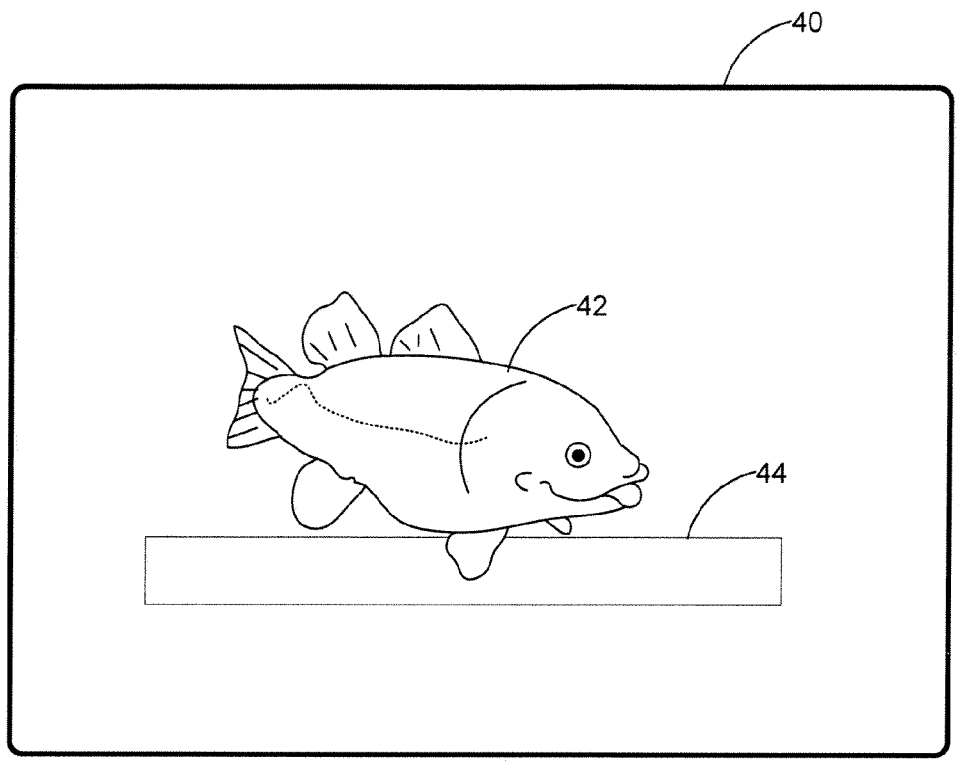
FIG. 4 is a schematic view of a digital image of a fish and a reference object.

The process starts at step 102 where a digital image 40 of a fish 42 and reference object 44, as shown in FIG. 4, is obtained either directly or remotely from, for example, the digital scanner 14, the digital camera 18 or the cell phone 19. Advantageously, the reference object 44 is of a predefined length. Some examples of reference objects include a linear measurement device, such as a ruler or tape measure, or another object of predetermined size from which a scale may be determined in the image.

In step 104 the contour of the reference object 44 is identified, either manually, by setting reference points at a first end of the reference object 44 and a second reference point at a second end of the reference object 44, or automatically by using, for example, an image processing algorithm for identifying contours of objects, for example using hue or texture variations. Advantageously, the reference object 44 may be of a specific color or texture not likely to be found in any fish so as to heighten color or texture contrasts.

In step 106 the system 20 determines a relative length of the reference object 44 by computing, for example, the number of pixels along its longest axis generally parallel to sides of its identified contour. Alternatively, the length may be determined by a scale shown on the reference object, or by knowledge of a fixed dimension of the object.

In step 108 the contour of the fish 42 is identified, either manually, by setting reference points at a first end of the fish 42 and a second reference point at a second end of the fish 42, or automatically by using, for example, an image processing algorithm for identifying contours of object, for example using hue or texture variations. Advantageously, the image processing algorithm may be defined such as to recognize specific colors or textures commonly found in fishes.

In step 110, the system 20 determines a relative length of the fish 42 by computing, for example, the number of pixels along its longest axis generally parallel to sides of its identified contour. As discussed above, the length of the fish may also be indicated by a visual comparison of the fish to the reference object. For example, if the reference object is a ruler or tape measure, the object may be positioned adjacent to the fish in the image in such a way as to indicate the length of the fish as measured by the scale of the ruler or tape measure.

If the relative lengths of the reference object 44 and the fish 42 are used to determine the length of the fish, the system 20 computes the length of the fish using a rule of three based on a predetermined length of the reference object 44 or by inputting the length of the reference object 44. For example, if the length of the reference object is 30 inches and has a relative length of 900 pixels and the fish 42 has a relative length of 600 pixels, then the length of the fish may be computed as follows:

$$\text{length of fish} = (30 \text{ inches} \times 600 \text{ pixels}) / 900 \text{ pixels}$$
$$= 20 \text{ inches.}$$

Finally, in step 114, the length of the fish 42 computed in step 112 is provided by the system 20, for example by displaying the length of the fish 42 and/or saving it to the database 24.

Figure 3A:
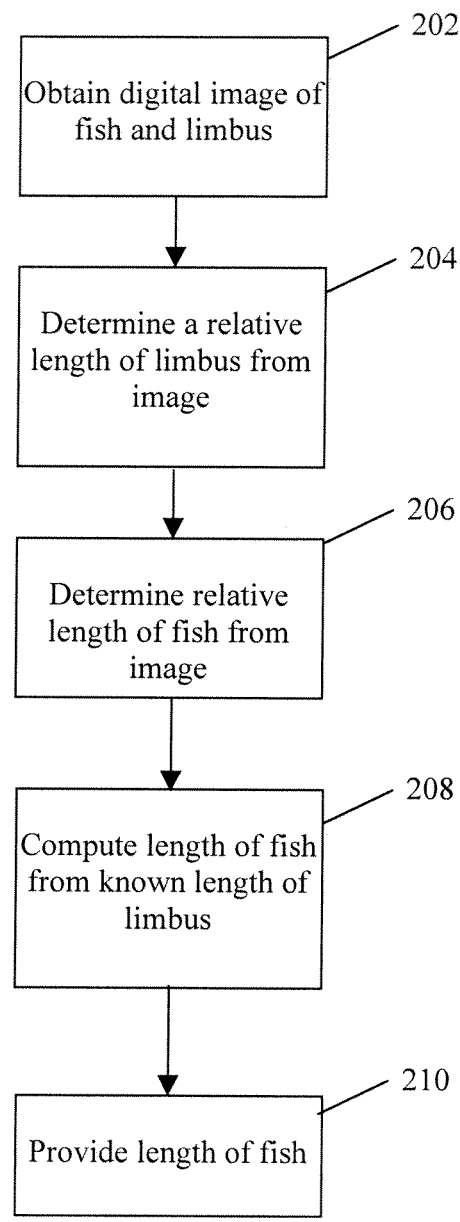
FIG. 3A is a flow diagram depicting a method of measuring a fish using a biometric feature of a human depicted in an image with the fish.

The present invention may also use other methods of determining the size of fish from digital images submitted by the participants. In one embodiment, participants are required to submit digital images that include a picture of the fish along with a picture of a human face. This allows biometrical features of the human face to be used to determine the proper scale. For example, a human eye, such as the eye of the participant, may be used as a reference object. The limbus of the eye is the junction between the cornea and sclera, and it has an average width in adults of 11.6 mm that varies only minutely from one person to another. By using the limbus as a reference object in the image, the length of the fish may be ascertained, with less risk of falsification that might accompany other types of reference objects. The measurement of a human limbus in the image may also be used to determine when images have been manipulated, as the scale determined from the width of the limbus must agree within the limits of its possible range of variation with the scale of other objects in the image. A possible method of using the limbus as a reference object is depicted in the flow diagram of FIG. 3A.

In step 202, a digital image is obtained which depicts both a fish and a human eye, namely from the participant holding his or her catch. In step 204, a relative diameter of the limbus of the eye is determined from the image in terms of pixel space size. In step 206, a relative length of the fish is determined from the image in terms of pixel space dimensions. With these two parameters, the actual width of the limbus (known to a very slight variation from one person to another) is used to calculate the actual length of the fish in step 208. In step 210, the length of the fish is then provided to the tournament direction system.

More precise image analysis techniques may also be used for determining a reference scale in an image, or for verifying the authenticity of a submitted image. For example, the techniques described by Micah K. Johnson and Hany Farid (Department of Computer Science, Dartmouth College, Hanover, N.H.) in *Metric Measurements on a Plane from a Single Image* may be used in this capacity. Such techniques are known in the art and will not be repeated in any great detail herein. However, those skilled in the art will recognize, in light of the present disclosure, that such techniques may be applied herein. Likewise, the present invention anticipates the use of similar existing and future techniques for size determination and image authentication.

Other means of image authentication may also be employed herein. For example, the tournament participants may be required to submit a raw, unedited digital image. As described above, analysis techniques may be used to determine whether any alteration of the image has taken place. In addition, one embodiment of the invention relies on the presence of the metadata from the original captured image as one basis for verifying authenticity. As is known in the art, an original digital image file typically includes a set of metadata relative to various image parameters. However, many image editing applications either do not preserve this metadata, or record editing changes. Some edits may be deemed acceptable because they do not harm authenticity, while others can be disqualified. Thus, absence of the metadata or the metadata itself from an image file may be indicative of previous image editing. As such, in one embodiment of the invention, the tournament director would automatically reject any participant submission in which the metadata was absent.

A number of techniques can be used for image tampering determination, and thus for determining authenticity.

Most digital cameras employ a single sensor in conjunction with a color filter array (CFA), and then interpolate the missing color samples to obtain a three-channel color image. This interpolation is typically a simple linear interpolation between neighboring source pixels of the same color and introduces repeatable spatial artifacts that are detectable in an uncompressed image as well as in JPEG compressed images originating from the camera using correlation with the CFA pattern that are likely to be altered when tampering with an image. This technique estimates the artifact introduced by CFA interpolation, and detects deviations due to tampering.

When tampering with an image, the image must, at a minimum, be loaded into photo-editing software, manipulated, and re-saved. Since most images are stored in JPEG format (a majority of digital cameras store images directly in JPEG format), it is likely that both the original and tampered images are stored in this format. In this scenario the tampered image is double JPEG compressed. As will be appreciated by those skilled in the art, double JPEG compression introduces specific artifacts not present in singly compressed images, and these artifacts can be detected.

Most digital cameras export images in the JPEG file format. This lossy compression scheme employs a quantization table that controls the amount of compression achieved. Different cameras typically employ different tables, and photo-editing software used to manipulate images also alter an image's quantization table. The quantization tables from several images, purportedly from the same camera, can be compared for consistency. Any differences in these tables can be used as evidence of tampering.

The above techniques may be sufficient alone to conclude that tampering has taken place in a digital image, and likewise may not be entirely conclusive regarding tampering, but instead provided an index of a probability of tampering. Such techniques can be used alone or in addition to metadata verification to determine the authenticity of the image.

Figure 3B:
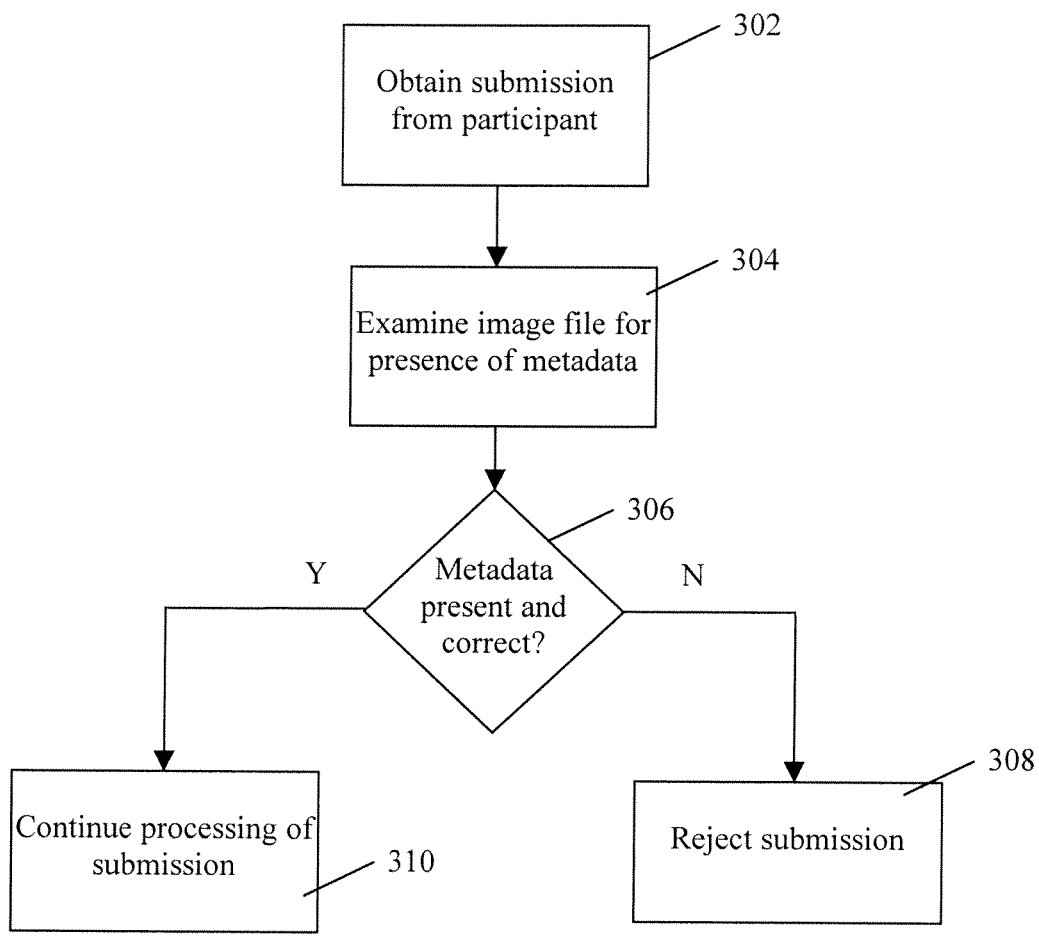
FIG. 3B is a flow diagram depicting a validation process of a submission using metadata in a digital image.

This verification process applies generally to a method for remotely recording a fishing catch, and is depicted graphically in the flow diagram of FIG. 3B. In step 302 of this diagram, a submission is obtained from a tournament participant. This submission includes a digital image of a fish and, in step 304, the image file is examined for the presence of metadata. In step 306, a decision is made as to whether the metadata is missing or contains any reference to an editing step or steps that are not approved. If not, the verification proceeds to step 310 for further processing of the submission. If the metadata is not present or indicates unapproved editing, the submission is rejected in step 308. The present invention also anticipates the use of such image verification and authentication techniques in the context of any remote recording of fish catches, whether or not done within the context of a tournament.

The method and system for measuring fish described herein may be used in the context of a fishing tournament in order to identify the winner of the tournament having caught the biggest fish. Accordingly, for authentication purposes, each participant advantageously receives a first validation code, such as an alphanumeric sequence, via, for example, text message or email. The first validation code is to appear in all digital images of fishes and the main purpose of the first validation code is to serve as a proof of timeframe, i.e. that the fish in the digital image was caught after the first validation code was issued. It is to be understood that other validation techniques may also be used.

Figure 5:
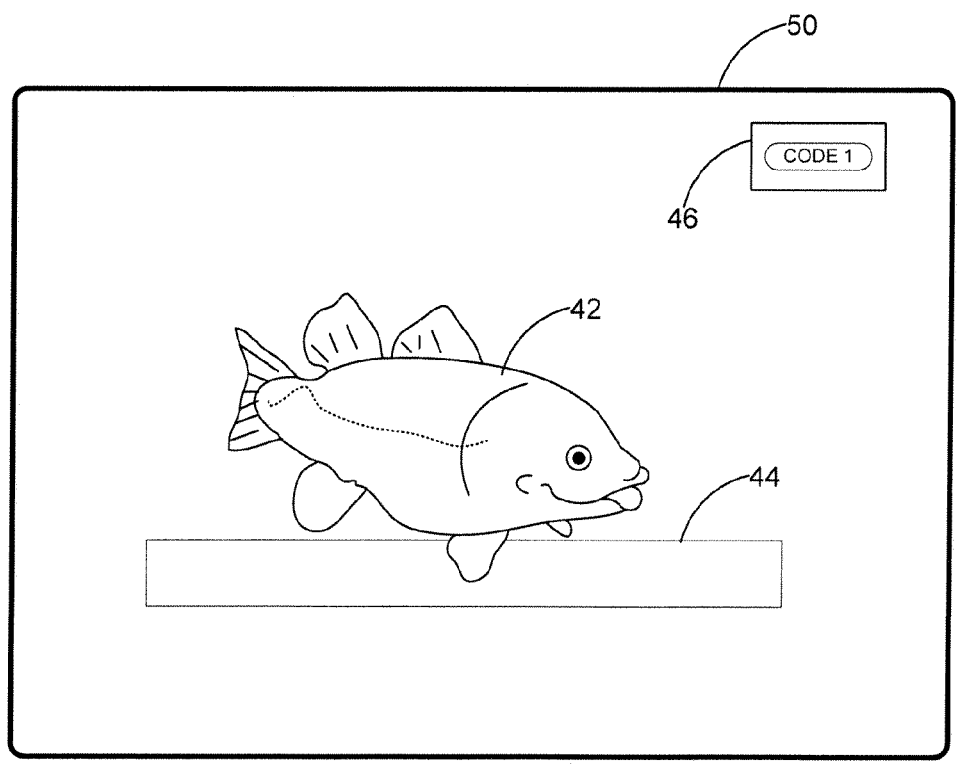
FIG. 5 is a schematic view of a digital image of a fish, a reference object and a validation code.

FIG. 5 shows a digital image 50 of a fish 42 and reference object 44 where the first validation code 46 may be seen in order to validate the timeframe in which the digital image 50 was taken.

Figure 6:
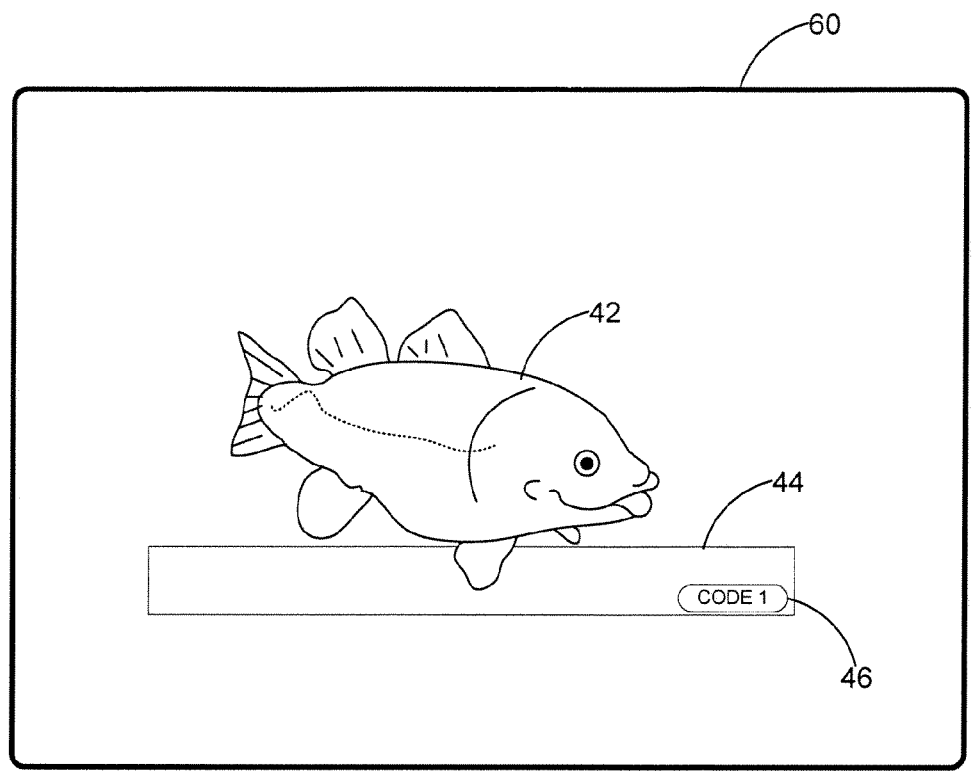
FIG. 6 is a schematic view of an alternative embodiment of the digital image of FIG. 5.

In an alternative embodiment, shown in the digital image 60 of FIG. 6, the first validation code 46 may be inscribed on, or otherwise applied to, the reference object 44 so as to also authenticate the reference object 44 thereby helping to reduce the risks of tampering. It is to be understood that instead of sending the first validation code 46 via text message or email, the reference object 44 may be previously inscribed with the first validation code and provided to the participant at the beginning of the tournament.

Figure 7:
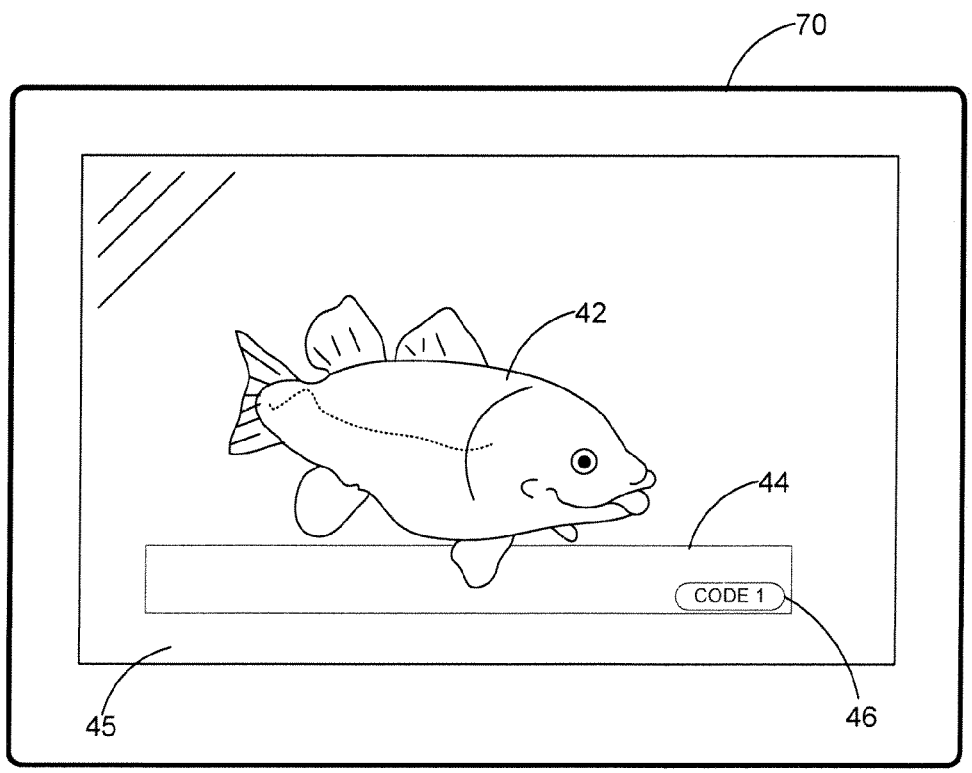
FIG. 7 is a schematic view of the digital image of FIG. 6 to which is added a contrasting background.

In another alternative embodiment, shown in the digital image 70 of FIG. 7, a background 45, having a color or texture not likely to be found in any fish or reference object, may be positioned underneath the fish 42 or reference object 44 so as to heighten color or texture contrasts of the fish and the reference object in order to facilitate the identification of the contours of the fish 42 and of the reference object 44 in steps 108 and 104, respectively, of the flow diagram of FIG. 3. It is to be understood that the first validation code may be inscribed, or otherwise applied to, either, or both, of the reference object 44 and/or the background 45. It is also to be understood that, similarly to the embodiment of FIG. 6, instead of sending the first validation code 46 via text message or email, the reference object 44 and/or the background

45 may be previously inscribed with the first validation code and provided to the participant at the beginning of the tournament.

Figure 8:
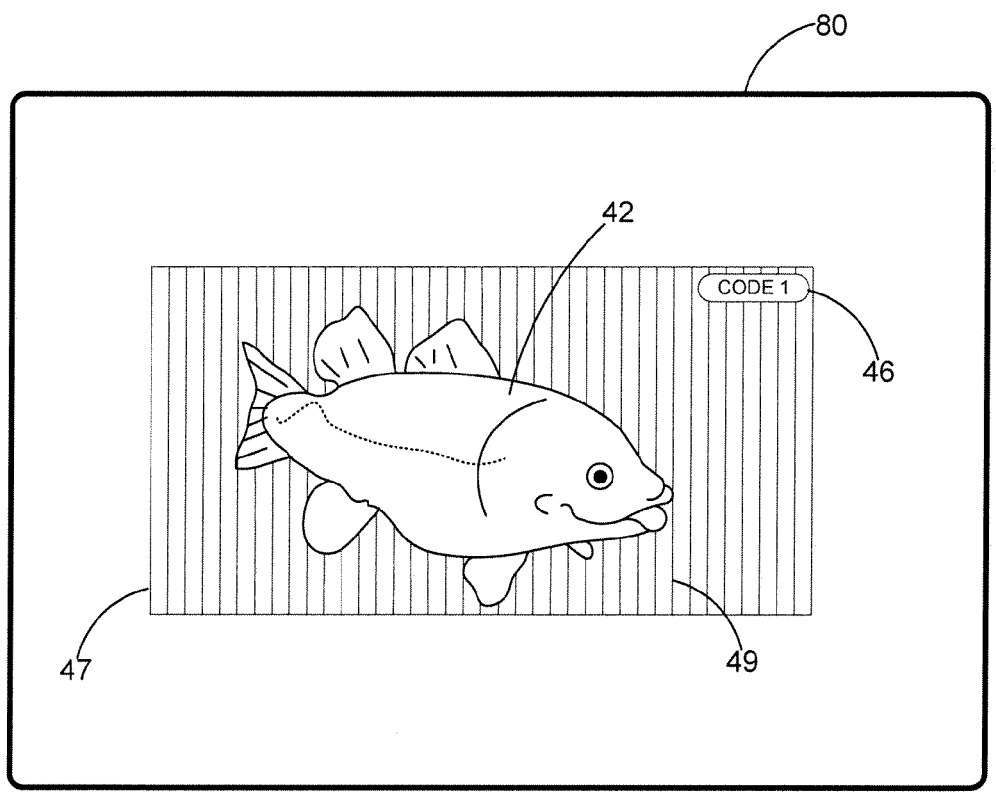
FIG. 8 is a schematic view of a digital image of a fish, a reference grid and a validation code.

In another alternative embodiment, shown in the digital image 80 of FIG. 8, a background grid 47 providing reference lines 49 at predetermined distances, may be positioned underneath the fish 42 or reference object in order to facilitate the identification of the contours of the fish 42 and of the reference object 44 in steps 108 and 104, respectively, of the flow diagram of FIG. 3. Furthermore, the background grid 47 of FIG. 8 may also have a color or texture not likely to be found in any fish or reference object, so as to heighten color or texture contrasts of the fish and the reference object in order to further facilitate the identification of the contours of the fish 42 and of the reference object 44 in steps 108 and 104, respectively, of the flow diagram of FIG. 3. It is to be understood that the first validation code may be inscribed, or otherwise applied to, either, or both, of the reference object 44 and/or the background grid 47. It is also to be understood that, similarly to the embodiment of FIG. 6, instead of sending the first validation code 46 via text message or email, the reference object 44 and/or the background grid 47 may be previously inscribed with the first validation code and provided to the participant at the beginning of the tournament.

In a further alternative embodiment, a second validation code may be provided to the participant at the end of the tournament so as to ensure that the participant remains at the tournament location until the end of the tournament.

Figure 9:
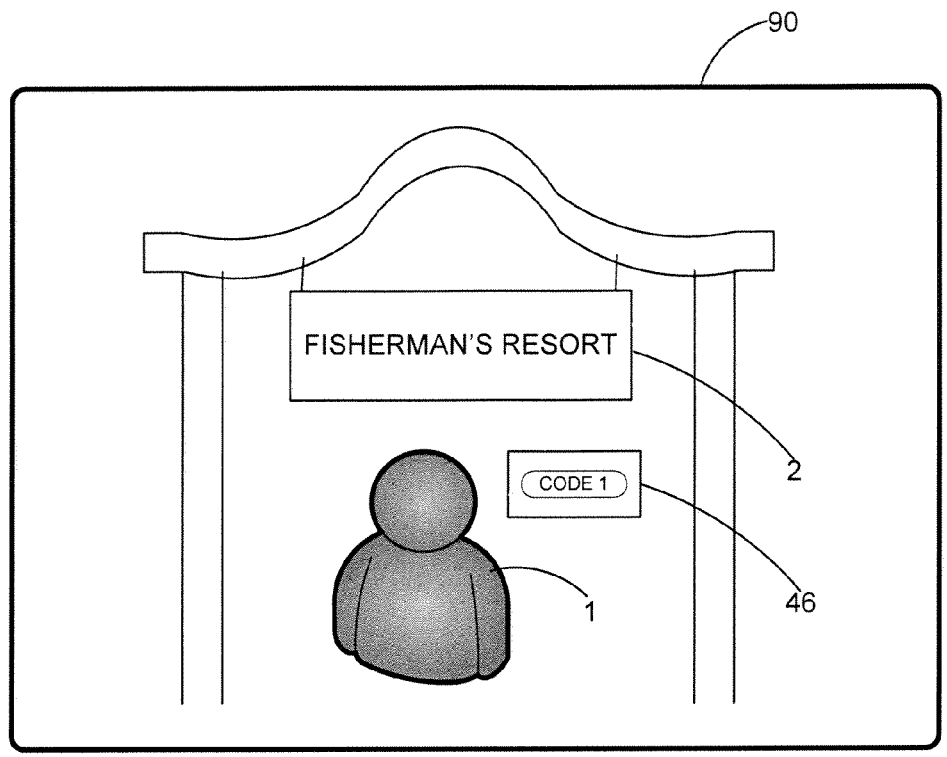
FIG. 9 is a schematic view of a digital image of a participant with a location indicator and a first validation tag.
Figure 10:
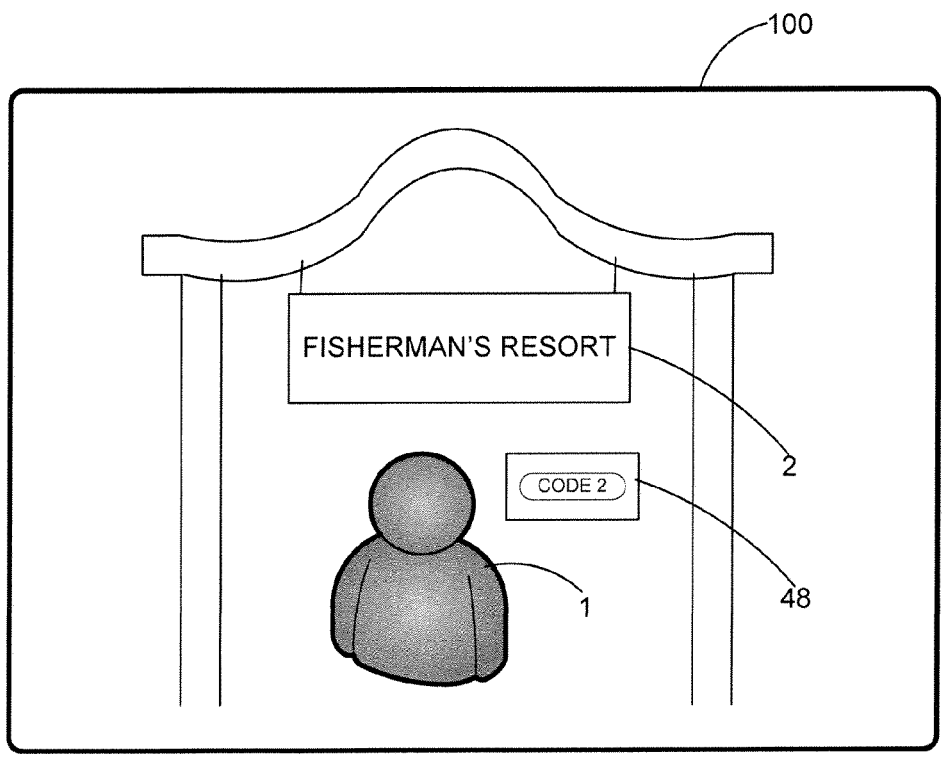
FIG. 10 is a schematic view of a digital image of a participant with a location indicator and a second validation tag.

Referring to FIG. 9, this may be accomplished by taking a first digital image 90 of the participant 1, with the first validation code 46, in front of a landmark 2 identifying the location of the participant 1. Then, with reference to FIG. 10, at the end of the tournament the participant 1 is given a second validation code 48 so that a second digital image 100 of the participant 1, with the second validation code 48, may be taken in front of the landmark 2 of the first digital image 90 so as to prove that the participant 1 is still at the tournament location.

In yet another alternative embodiment, different codes may be issued to different participants for the same tournament. For example, each participant may be given a different code, such that each code serves to uniquely identify one participant as well as verify the time period within which submitted images were taken. Such unique codes may be particularly useful for a tournament having multiple fishing periods. If, for example, a one-week tournament included seven one-day fishing periods, a participant could be allowed to register for some or all of the fishing periods during the tournament. The issuance of a unique code to each participant would provide a simple means to cross-reference a submission with the fishing periods for which a participant registered.

It may also be desirable to issue codes to participants which are different only in identifying the fishing periods for which the respective participants registered. Thus, different participants who registered for the same fishing periods would have the same code. This would allow the different codes to be issued at the appropriate times relative to particular fishing periods to ensure that participants are able to use the code only during the periods for which they are registered. However, providing a unique code to each participant would also allow each participant to be identified by the code, and would allow a participant to register for additional fishing periods during the tournament while keeping the same code. The codes may also be indicative of time zones, if the geographical area spanned by the tournament includes multiple time zones. This would simplify the cross-referencing of a participant submission with time deadline for uploading the submission that is appropriate for the time zone of that participant.

A digital image containing the fish caught and the code provides evidence of the catch as being from a time period after issuance of the code and before the digital image is uploaded to the server. When a participant fishes for a number of consecutive periods, it will be appreciated that upload to the server may be done well after the first period, as long as it is within the time limit allowed for the upload of images following the last period that the participant has paid for.

As described herein, the present invention provides a method and system for remotely directing a fishing tournament using a data network, such as the Internet. At least one central server may be used to store information regarding each tournament and to collect and process registrations and submissions of participants. Each participant in the tournament may communicate with the server via a local computer, telephone, or other device capable of exchanging data over the network. For example, the central server may present information regarding the tournament via a web site on the Internet that is accessible by the participants via a web browser. Through this interface, the participants may register for particular fishing periods, submit payment information, receive codes, submit images and other information regarding fish catches, and retrieve tournament results.

As discussed above, other means of communication may also be used for various aspects of the invention. For example, codes may be issued to participants via telephone (voice) or text message. This would be particularly useful if a participant has traveled to a location where access to the data network is limited or impossible. In such a case, a participant may register and travel in advance to the desired fishing location. At an appropriate time relative to the fishing period or periods for which the participant has registered, the code may then be retrieved. Voice or text message communication may also be useful to provide information to a participant in a remote location, or to allow the participant to register for additional fishing periods without having to seek out the nearest location with access to the data network.

A director of the tournament may also use a website to promote the fishing tournaments, and to provide detailed data regarding tournament results. Data regarding an ongoing tournament may also be provided via the network, or via voice or text message. For example, a website of the tournament director may display rankings of participants for an ongoing tournament based on submissions received. The rankings may be updated as additional submissions are received and verified. In such a case, it may also be desirable to show the rankings without reference to the size of fish caught, so as to not influence the decisions of participants regarding registering for additional fishing periods during the tournament.

The tournament director may also provide data regarding past tournaments and tournament participants. For example a website of the tournament director may include sections showing the prior success of various participants. Such information may be organized and cross-referenced by particular tournaments and particular participants, such that statistics for a given tournament or given participant are available to the participants and possibly to the public. Those skilled in the art will recognize that there are many different types of data that would be of interest to participants and to the public, and organization and presentation of such data is an anticipated part of the invention.

The present invention provides a great deal of flexibility in how a tournament is conducted. As discussed above, participants may fish in different geographical locations. The tournament director may specify that the tournament is limited to a single species of fish, or may designate multiple species. There may be a single fee or multiple fees for the different species. As discussed above, there may be multiple fishing periods within the tournament period, and a participant may be allowed to register for one period only, for multiple consecutive periods, or for multiple non-consecutive periods. Fees for each participant may therefore also be based on the number of fishing periods for which the participant is registered. If a code is issued to a participant, it will typically be provided shortly before the tournament starts. However, registration for tournaments may be done well in advance of the tournament period, with the codes being provided later. Likewise, the tournament director may choose to allow registration for a fishing period after that period has already begun. The tournament director may also base fees on the time of registration (such as by providing a discount for early registrants), and may provide prizes for the winners that are based on the number of entries (e.g., such that the prize values increase with the number of participants).

Although the present invention has been described by way of particular embodiments and examples thereof, it should be noted that it will be apparent to persons skilled in the art that modifications may be applied to the present particular embodiment without departing from the scope of the present invention. It is also to be understood that although the disclosed method is used to measure a fish, the same method may be applied to determine the length of other objects from a digital image as long a reference object of determined length is included in the digital image.

The invention claimed is:

1. A method for remotely directing a fishing tournament, the method comprising:
 a. receiving by a server a digital image of a fish caught by a tournament participant over a data network, the image containing a reference object of a known size adjacent to the fish to allow a determination of scale;
 b. determining by the server a pixel count of the fish and a pixel count of the reference object from the image;
 c. determining by the server a size of the fish from the image by using the pixel counts of the fish and the reference object and the scale provided by the reference object; and
 d. further comprising identifying, within metadata in the digital image, a prohibited type of editing for purposes of invalidating the digital image received by the tournament participant.

2. The method of claim 1, further comprising using metadata in the digital image to authenticate the digital image, wherein the metadata is verified relative to predetermined image parameters.

3. The method of claim 1, further comprising using the absence of metadata in the digital image to authenticate the digital image and possibly invalidate the digital image received by the tournament participant.

4. The method of claim 1, further comprising determining a contour of the reference object from the image, and determining a contour of the fish from the image, wherein the pixel count of the fish is a pixel count of the contour of the fish and the pixel count of the reference object is a pixel count of the contour of the reference object.

5. The method of claim 4, wherein the contour of the reference object is determined by a first image processing algorithm.

6. The method of claim 5, wherein the contour of the reference object is determined by a second image processing algorithm.

7. The method of claim 6, wherein the first and second image processing algorithms are based on hue or texture variations.

8. The method of claim 7, wherein the reference object is of a specific color or texture that heightens the contrast between the reference object and the fish.

9. The method of claim 1, wherein the size is determined in one dimension.

10. The method of claim 9, wherein the size is determined in one or two dimensions.

11. The method of claim 9, wherein the reference object comprises a linear measurement device.

12. The method of claim 1, wherein the reference object comprises a human biometric indicium.

13. The method of claim 12, wherein the biometric indicium is based on the limbus of a human eye.

14. A system for remotely directing a fishing tournament, comprising:
 a. a server for receiving a digital image of a fish caught by a tournament participant over a data network, the image containing a reference object of a known size adjacent to the fish to allow a determination of scale;
 b. wherein the server is configured to:
  i. determine a pixel count of the fish and a pixel count of the reference object from the image, and
  ii. determine a size of the fish from the image by using the pixel counts of the fish and the reference object and the scale provided by the reference object; and
 wherein the server is further configured to use metadata in the digital image to authenticate the digital image, wherein the metadata is verified relative to predetermined image parameters.

15. The system of claim 14, wherein the server is further configured to determine a contour of the reference object from the image, and determine a contour of the fish from the image, wherein the pixel count of the fish is a pixel count of the contour of the fish and the pixel count of the reference object is a pixel count of the contour of the reference object.

16. The system of claim 14, wherein the server is further configured to use the absence of metadata in the digital image to authenticate the digital image and possibly invalidate the digital image received by the tournament participant.

17. The system of claim 14, wherein the server is further configured to identify, within metadata in the digital image, a prohibited type of editing for purposes of invalidating the digital image received by the tournament participant.

* * * * *